(12) United States Patent
Kazama

(10) Patent No.: US 11,831,995 B2
(45) Date of Patent: Nov. 28, 2023

(54) IMAGE CAPTURING APPARATUS, IMAGE CAPTURING METHOD, AND CARRIER MEANS

(71) Applicant: Yasuhiro Kazama, Kanagawa (JP)

(72) Inventor: Yasuhiro Kazama, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 210 days.

(21) Appl. No.: 17/423,122

(22) PCT Filed: Jan. 21, 2020

(86) PCT No.: PCT/JP2020/001943
§ 371 (c)(1),
(2) Date: Jul. 15, 2021

(87) PCT Pub. No.: WO2020/158509
PCT Pub. Date: Aug. 6, 2020

(65) Prior Publication Data
US 2022/0078328 A1   Mar. 10, 2022

(30) Foreign Application Priority Data

Jan. 30, 2019   (JP) ................................ 2019-014627

(51) Int. Cl.
*H04N 5/265* (2006.01)
*H04N 23/741* (2023.01)
(Continued)

(52) U.S. Cl.
CPC ........... *H04N 23/741* (2023.01); *H04N 5/265* (2013.01); *H04N 23/73* (2023.01); *H04N 23/90* (2023.01)

(58) Field of Classification Search
None
See application file for complete search history.

(56) References Cited

U.S. PATENT DOCUMENTS

| 2003/0099407 A1 | 5/2003 | Matsushima |
| 2012/0268641 A1 | 10/2012 | Kazama |

(Continued)

FOREIGN PATENT DOCUMENTS

| CN | 101399921 A | 4/2009 |
| CN | 106632511 A | 10/2018 |

(Continued)

OTHER PUBLICATIONS

International Search Report dated Jun. 12, 2020 in PCT/JP2020/001943 filed on Jan. 21, 2020, 10 pages.

(Continued)

*Primary Examiner* — Eileen M Adams
(74) *Attorney, Agent, or Firm* — XSENSUS LLP

(57) ABSTRACT

An image capturing apparatus includes a plurality of image capturing units; a calculation unit to calculate a common correction value commonly applied to the image capturing units in performing dynamic range correction, based on an image-capturing signal output from each of the plurality of image capturing units; a setting unit to set an exposure condition for each of the image capturing units based on the common correction value; and a control unit to control the plurality of image capturing units to capture images to be combined under the set exposure condition for each of the image capturing units.

11 Claims, 9 Drawing Sheets

(51) Int. Cl.
*H04N 23/73* (2023.01)
*H04N 23/90* (2023.01)

(56) References Cited

U.S. PATENT DOCUMENTS

| | | |
|---|---|---|
| 2015/0116538 A1 | 4/2015 | Terauchi et al. |
| 2015/0189152 A1* | 7/2015 | Okamoto ............ H04N 23/661 |
| | | 348/207.11 |
| 2016/0134817 A1 | 5/2016 | Yoshikawa |
| 2016/0269607 A1 | 9/2016 | Nomura |
| 2017/0171446 A1* | 6/2017 | Nashizawa ............ G06T 5/007 |
| 2018/0020160 A1* | 1/2018 | Lin ........................ H04N 23/45 |
| 2019/0045146 A1 | 2/2019 | Terauchi et al. |
| 2019/0068890 A1 | 2/2019 | Kazama |

FOREIGN PATENT DOCUMENTS

| | | |
|---|---|---|
| EP | 3068126 A1 | 9/2016 |
| JP | 2003-169231 | 6/2003 |
| JP | 2009-044243 A | 2/2009 |
| JP | 2010-074535 | 4/2010 |
| JP | 2010-193099 | 9/2010 |
| JP | 2016-040883 A | 3/2016 |
| JP | 2017-225036 | 12/2017 |

OTHER PUBLICATIONS

Office Action dated Aug. 23, 2022 in Japanese Patent Application No. 2019-014627, 7 pages.
Office Action dated Aug. 17, 2022 in Chinese Patent Application No. 202080010816.6, 9 pages.

* cited by examiner

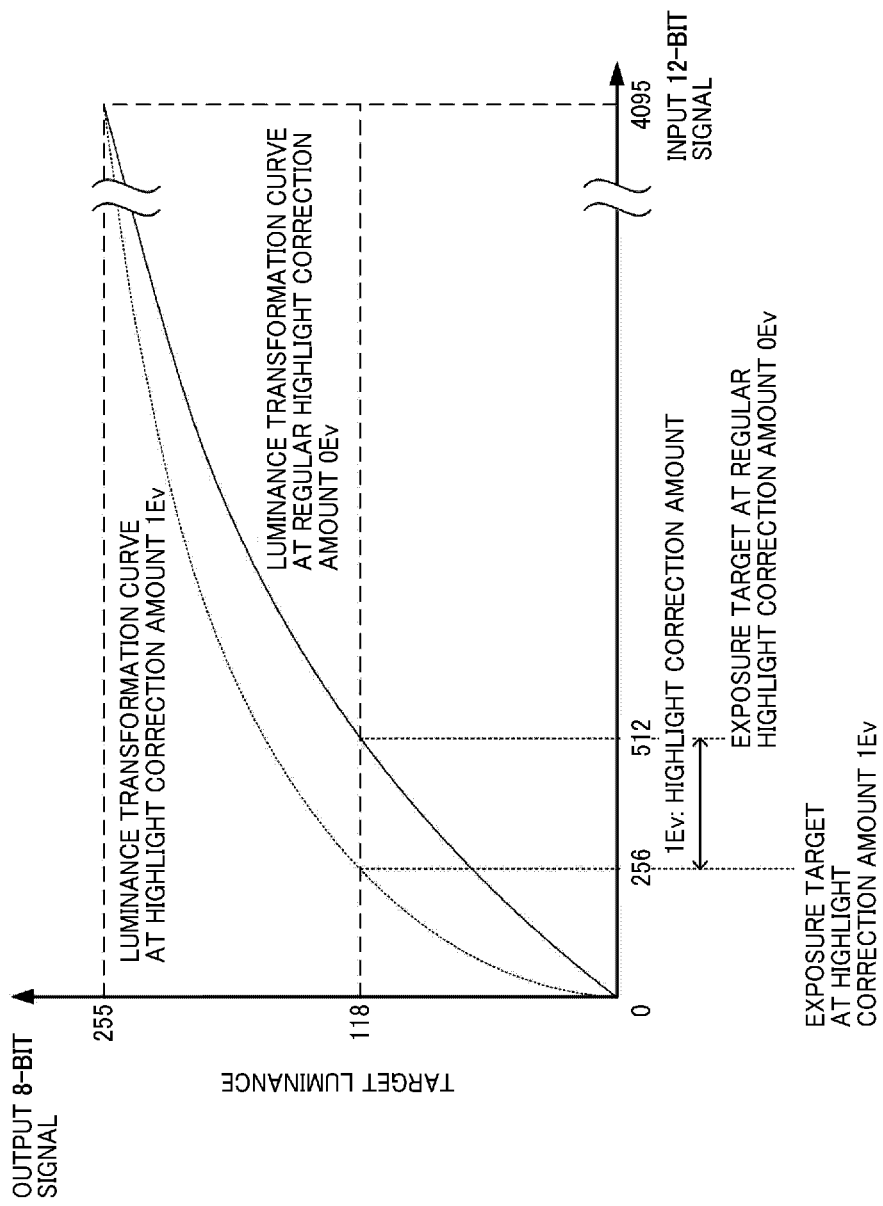

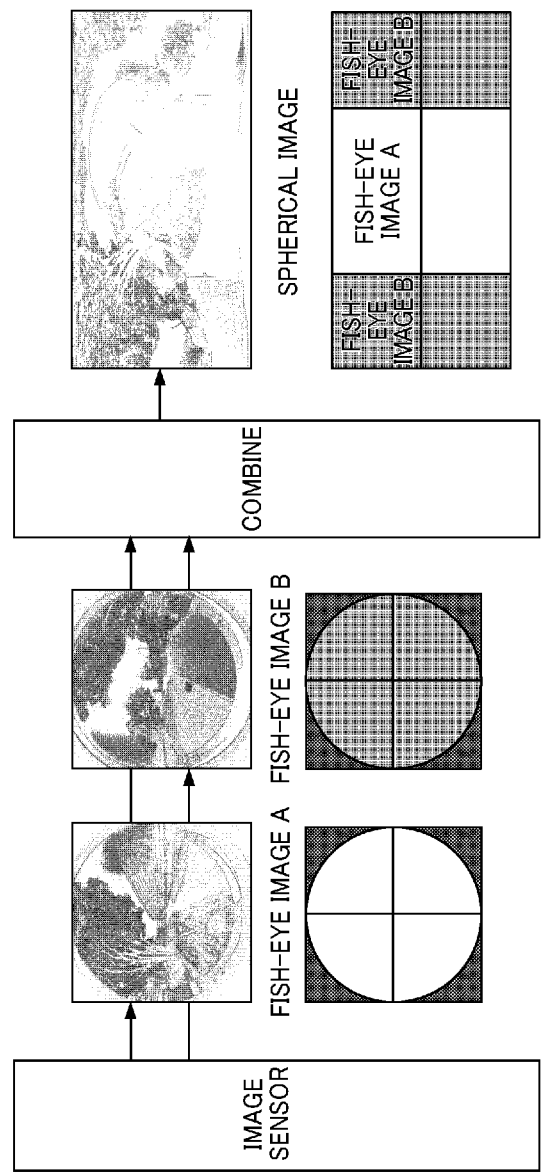

IMAGE CAPTURING APPARATUS, IMAGE CAPTURING METHOD, AND CARRIER MEANS

CROSS-REFERENCE TO RELATED APPLICATIONS

The present application is based on PCT filing PCT/JP2020/001943, filed Jan. 21, 2020, which claims priority to JP 2019-014627, filed Jan. 30, 2019, the entire contents of each are incorporated herein by reference.

TECHNICAL FIELD

The embodiments of the present disclosure relate to an image capturing apparatus, image capturing method, and carrier means.

BACKGROUND ART

Conventionally, an image capturing apparatus, such as a spherical camera, includes a plurality of imaging devices each including an optical system and an image sensor, used to capture images and join them together so as to generate an image such as a spherical image.

Further, the dynamic range correction technique such as highlight correction is known, with which a degradation in gradation such as halation (overexposure) in captured images is reduced. In the typical highlight correction technique, an image correction is performed such that the exposure level for capturing an image is lowered (under-correction) from a proper exposure level by a highlight correction amount so as to obtain a predetermined highlight correction amount, and the halftone of a captured image is increased by the amount of correction. Accordingly, an output image whose overall brightness is substantially uniform and from a highlighted portion of which halation is substantially eliminated is obtained of highlighted, as compared to the case of the regular image capturing process. In addition, as an extension of the highlight correction technique, an automatic highlight correction technique is also known that calculates an optimal highlight correction amount according to an image-capturing scene, using information regarding a photometric value obtained by performing the photometry on the captured screen sectioned before the start of the image capturing.

For example, JP-4999871-B (JP-2010-193099-A) discloses the technique that substantially prevents halation of a high-luminance portion in a captured image. The technique of JP-4999871-B determines a scene from a moving-image data captured before capturing a still image and, for each scene determined to need a reduction in halation, apply a gradation correction to a still image captured with a reduced imaging sensitivity so as to compensate for the reduced amount of the imaging sensitivity.

However, it is difficult to obtain an image with sufficient quality if the highlight correction or the automatic highlight correction is performed on a plurality of images captured by the image capturing apparatus provided with a plurality of imaging devices. This is because the joint portions between the images captured by the plurality of imaging devices look unnatural due to differences in brightness generated at the joint portions of the joined images.

CITATION LIST

Patent Literature

[PTL 1] JP-4999871-B

SUMMARY OF INVENTION

Technical Problem

The present disclosure is made in light of the above-described situation, and an object of the disclosure is to provide an image capturing apparatus including a plurality of imaging devices, capable of generating an image whose deterioration in gradation is reduced and whose differences in brightness in a subject at the joint portions of joined images is reduced. [Solution to Problem]

In view of the above, there is provided an image capturing apparatus including a plurality of image capturing units; a calculation unit to calculate a common correction value commonly applied to the image capturing units in performing dynamic range correction, based on an image-capturing signal output from each of the plurality of image capturing units; a setting unit to set an exposure condition for each of the image capturing units based on the common correction value; and a control unit to control the plurality of image capturing units to capture images to be combined under the set exposure condition for each of the image capturing units.

Advantageous Effects of Invention

The embodiments of the present disclosure provide an image capturing apparatus including a plurality of imaging devices is provided that is capable of generating an image whose deterioration in gradation is reduced and whose differences in brightness in a subject at the joint portions of joined images is reduced.

BRIEF DESCRIPTION OF DRAWINGS

The accompanying drawings are intended to depict example embodiments of the present disclosure and should not be interpreted to limit the scope thereof. The accompanying drawings are not to be considered as drawn to scale unless explicitly noted. Also, identical or similar reference numerals designate identical or similar components throughout the several views.

FIG. 4 is a graph showing a relationship between an input signal and an output signal after luminance conversion in both cases where highlight correction is performed and highlight correction is not performed.

FIG. 5A is a data flow diagram for describing generation of a spherical image.

DESCRIPTION OF EMBODIMENTS

Figure 1:
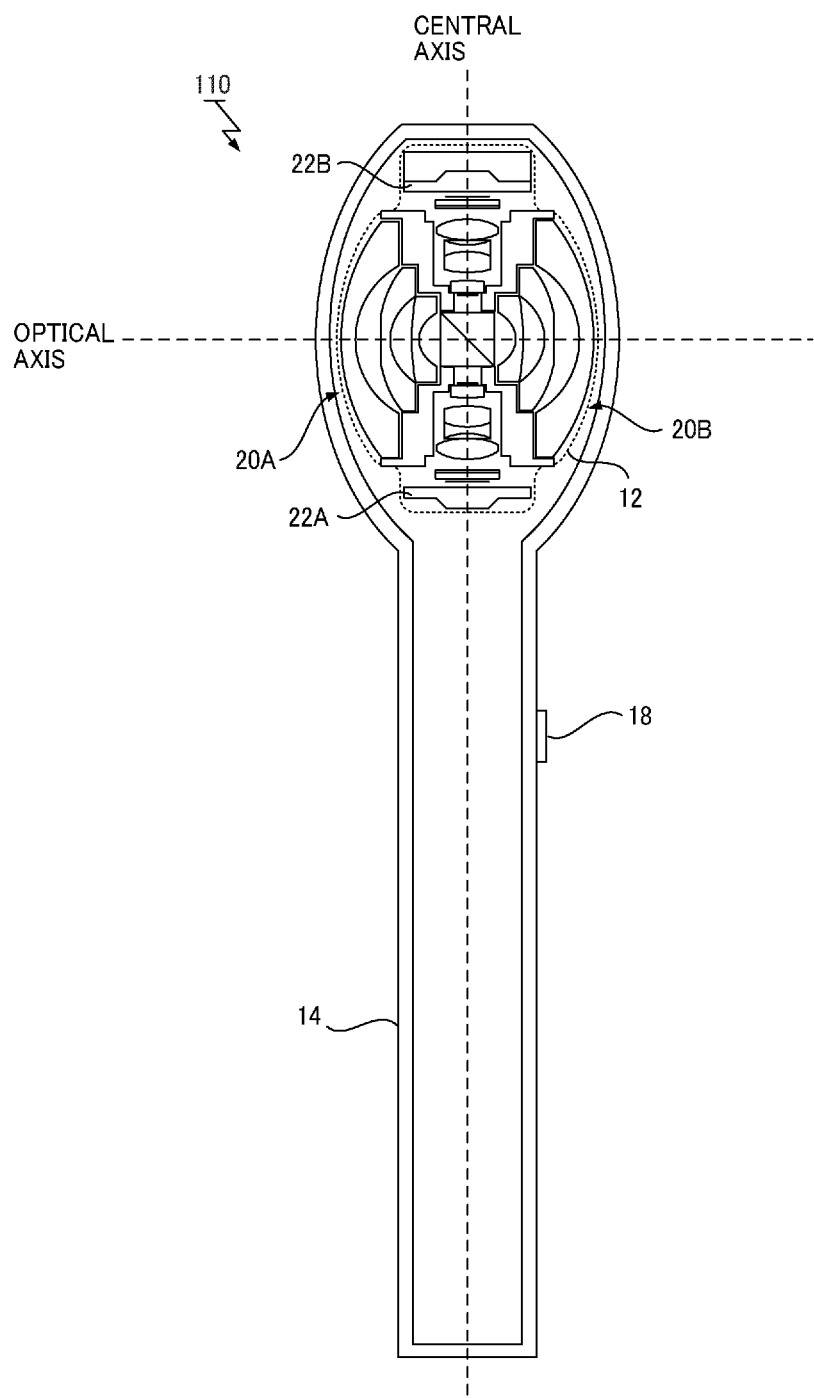
FIG. 1 is a cross-sectional view of a spherical-image capturing apparatus according to an embodiment.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Embodiments of the present disclosure are described in detail referring to the drawings. Like reference signs are applied to identical or corresponding components throughout the drawings and redundant description thereof may be omitted.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result. The following embodiments are described with a spherical-image capturing apparatus 110 as an example of an image capturing apparatus. However, no limitation is intended thereby.

Hereinafter, the configuration of the spherical-image capturing apparatus 110 according to an embodiment is described with reference to FIGS. 1 and 2.

FIG. 1 is a cross-sectional view of the spherical-image capturing apparatus 110 according to an embodiment. The spherical-image capturing apparatus 110 in FIG. 1 includes an imaging body 12, a casing 14, and a shutter button 18. The casing holds a component, such as the imaging body 12, a circuit board, and a battery.

The imaging body 12 in FIG. 1 includes two lens barrel units each including an image-forming optical system 20 and an image sensor 22. The image sensor 22 is, for example, a charge coupled device (CCD) or a complementary metal oxide semiconductor (CMOS), and is controlled by a control command from the CPU. Each image-forming optical systems 20 is configured as a fish-eye lens consisting of, for example, seven lenses in six groups. In the embodiment illustrated in FIG. 1, the above-mentioned fish-eye lens has a full angle of view of greater than 180 degrees (=360 degrees/n, where n denotes the number of optical systems and n is 2). Preferably, the fish-eye lens in FIG. 1 has an angle of view of 185 degrees or greater, and more preferably of 190 degrees or greater. Such a wide-angle combination of one of the image forming optical systems 20 and one of the image sensors 22 constitutes an image capturing section in the present embodiments. In the embodiments to be described, the case where two optical systems (image capturing units) are incorporated in the spherical-image capturing apparatus 110 is described. However, this is only one example, and three or more optical systems (image capturing units) may be incorporated in the spherical-image capturing apparatus 110.

The relative positions of the optical elements (lenses, prisms, filters, and aperture stops) of the two image-forming optical systems 20A and 20B are defined with reference to the image sensors 22A and 22B. More specifically, these elements are positioned such that the optical axis of the optical element of each of the image-forming optical systems 20A and 20B meets the central portion of the light receiving area of corresponding one of the image sensors 22 at the right angle and such that the light receiving area serves as the image-forming plane of corresponding one of the fish-eye lenses.

In the embodiment illustrated in FIG. 1, the image-forming optical systems 20A and 20B have the same specification, and are combined facing the opposite directions such that the optical axes thereof match with each other. The image sensors 22A and 22B transform the light distribution of the received light into image signals, and sequentially output image frames to an image processing block of the control board. As will be described later in detail, the images captured by the respective image sensors 22A and 22B are combined to generate an image over a solid angle of 4a steradian (hereinafter, such an image is referred to as a "spherical image"). The spherical image is an image of all the directions that can be seen from an image capturing point. In the following embodiments, cases where a spherical still image is generated are described. Alternatively, a full-circle still image or a panoramic still image may be generated. Note that such a panoramic image is obtained by photographing 360 degrees only in a horizontal plane.

Figure 2:
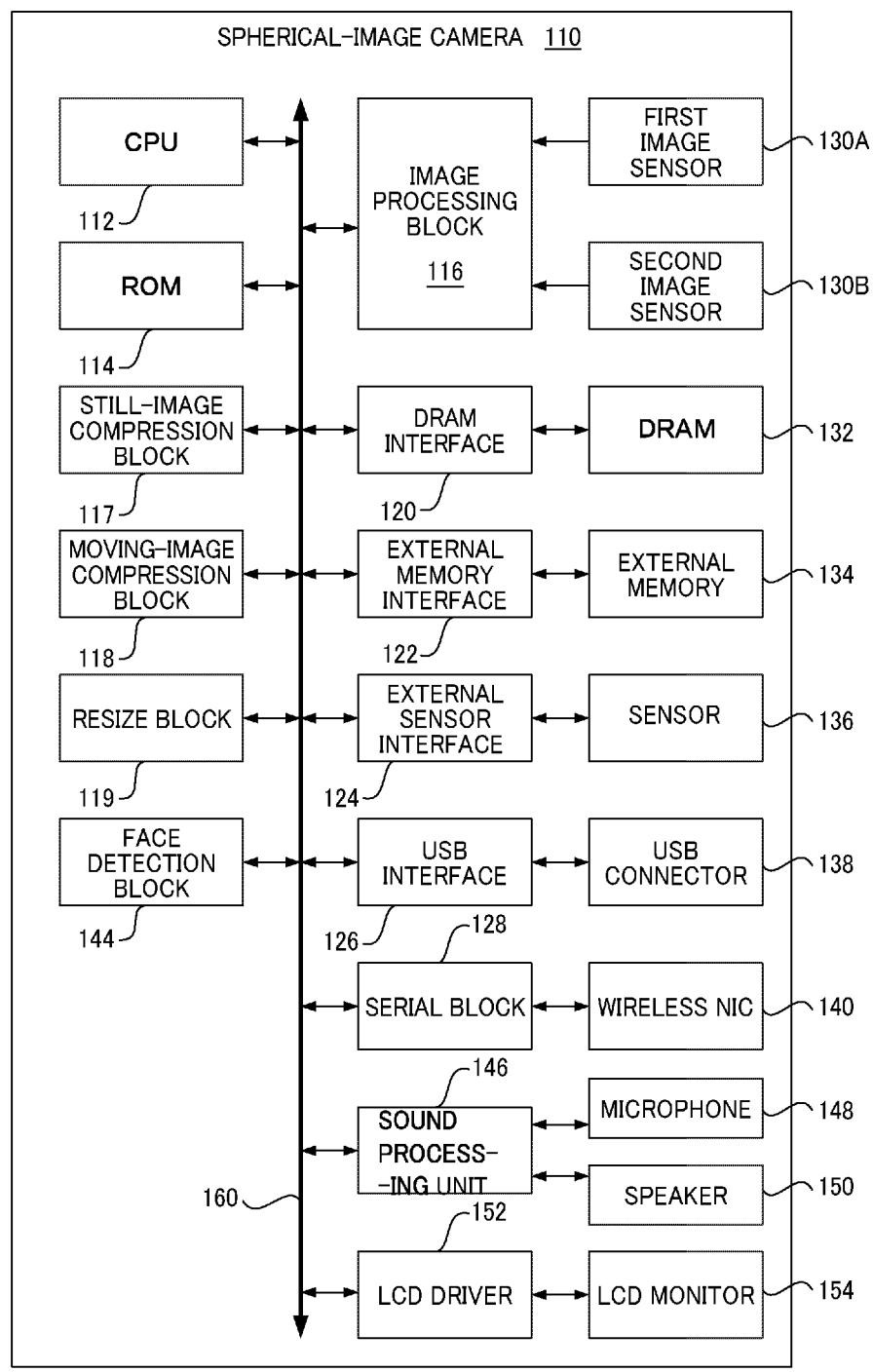
FIG. 2 is a block diagram of a hardware configuration of the spherical-image capturing apparatus according to an embodiment.

FIG. 2 is a block diagram of a hardware configuration of the spherical-image capturing apparatus 110 according to an embodiment. The spherical-image capturing apparatus 110 corresponds to an image capturing apparatus according to the embodiments to be described in this disclosure.

The spherical-image capturing apparatus 110 includes a central processing unit (CPU) 112 (a first CPU), a read only memory (ROM) 114, an image processing block 116, a still-image compression block 117, a moving-image compression block 118, a resize block 119, a dynamic random access memory (DRAM) 132 connected thereto via a DRAM interface 120, and a sensor 136 connected thereto via a sensor interface 124.

The CPU 112 controls the entire operations of the spherical-image capturing apparatus 110. The ROM 114 stores therein a control program described in a code readable by the CPU 112 and various kinds of parameters. By using rewritable flash ROM 114, the control program and the parameter for control can be changed, and a version of the function can be easily updated. In addition to the ROM 114 or together with the ROM 114, a storage such as an SSD for storing the control program may be provided. The image processing block 116 is connected to a first image sensor 130A and a second image sensor 130B (corresponding to the image sensors 22A and 22B in FIG. 1, respectively), and receives image signals of images captured by the image sensors 130A and 130B. The image processing block 116 includes, for example, an image signal processor (ISP), and applies, for example, shading correction, Bayer interpolation, white balance correction, and gamma correction to the image signals received from the image sensors 130A and 130B.

The still image compression block 117 is a codec block that compresses and expands a still image such as joint photographic experts group (JPEG). The moving-image compressing block 118 is a codec block for compressing and expanding a video such as that in moving picture experts group (MPEG)-4 advanced video coding (AVC)/H.264 format. In the present embodiments, JPEG and H.264 are described as examples of codecs for still images and moving images, respectively, but no limitation is intended thereby. Since there are various other variations of codecs, other codecs may be used, or a plurality of codecs may be installed. The resize block 119 is a block that enlarges or reduces the size of image data by interpolation processing.

The DRAM 132 provides a storage area for temporarily storing data therein when various types of signal processing and image processing are applied. Examples of the image data to be stored include RAW-RGB image data whose white balance and gamma have been set through the signal processing, YUV image data whose luminance data and color difference data have been converted through the signal processing, and JPEG image data on which, for example, JPEG compression has been performed by the still-image compression block 117.

The sensor 136 is, for example, a sensor for detecting three-axis acceleration components and three-axis angular velocity components. The detected acceleration component and angular velocity component are used to perform one or both of zenith correction of the spherical image in the direction of gravity (reference direction) and rotation correction around the direction of gravity as described later. The sensor 136 may further include other sensors such as a geomagnetic sensor for obtaining an azimuth angle. In the present embodiment, the sensor 136 is a three-axis sensor. However, this is only one example. Alternatively, the sensor 135 may be a six-axis acceleration sensor or a six-axis angular sensor.

The spherical-image capturing apparatus 110 further includes a storage interface 122, a universal serial bus (USB) interface 126, and a serial block 128. The storage interface 122 is connected to an external memory 134. The storage interface 122 controls reading and writing of data from and to an external memory 134, such as a memory card inserted in a memory card slot. The USB interface 126 is connected to a USB connector 138. The USB interface 126 controls USB-based communication with an external device such as a smartphone via the USB connector 138. The serial block 128 controls serial communication with an external device such as a smartphone and is connected to a wireless network interface card (NIC) 140.

The spherical-image capturing apparatus 110 in FIG. 2 further includes a face detection block 144. The face detection block 144 performs face detection using, for example, a fish-eye image or an image subjected to zenith correction, and identifies the position of a human face.

The spherical-image capturing apparatus 110 in FIG. 2 further includes a sound processing unit 146. The sound processing unit 146 is connected to a microphone 148 that inputs an audio signal and a speaker 150 that outputs the audio signal. The sound processing unit 146 typically has a microphone amplifier that amplifies an audio signal input via the microphone 148, an audio recording circuit that records the amplified audio signal, and a sound reproduction circuit that converts the recorded audio signal into a signal that can be output from the speaker 150, and an audio amplifier that drives the speaker 150. The sound processing unit 146 operates under the control of the CPU 112.

The spherical-image capturing apparatus 110 in FIG. 2 further includes a liquid crystal display (LCD) driver 152 to which a LCD monitor 154 is connected. The LCD driver 152 is a driver circuit that drives the LCD monitor 154 and performs conversion to a signal used to display various states on the LCD monitor 154. Instead of the LCD monitor 154, an organic light-emitting diode (OLED) display may be mounted.

The above-described components 112 to 128, 144, 146, and 152 are connected to each other via a bus 160. When the power is turned on by the operation of a power switch provided on the casing 14, the control program stored in the ROM 114 is loaded into a main memory such as a static random access memory (SRAM) and/or the DRAM 132, operating as a work area for the CPU 112. The CPU 112 executes the program read into the main memory to control the operations of the device, and temporarily stores the data required for the control in the main memory. Through this operation, the CPU 112 controls the spherical-image capturing apparatus 110 to implement various types of function or perform various types of operation as will be described later. The control program may include, for example, firmware, an operating system (OS), and a plug-in application.

Hereinafter, the functions of the spherical-image capturing apparatus 110 according to at least one embodiment, in which the highlight correction as an example of the dynamic range correction is included, is described with reference to FIGS. 3 to 7.

Figure 3:
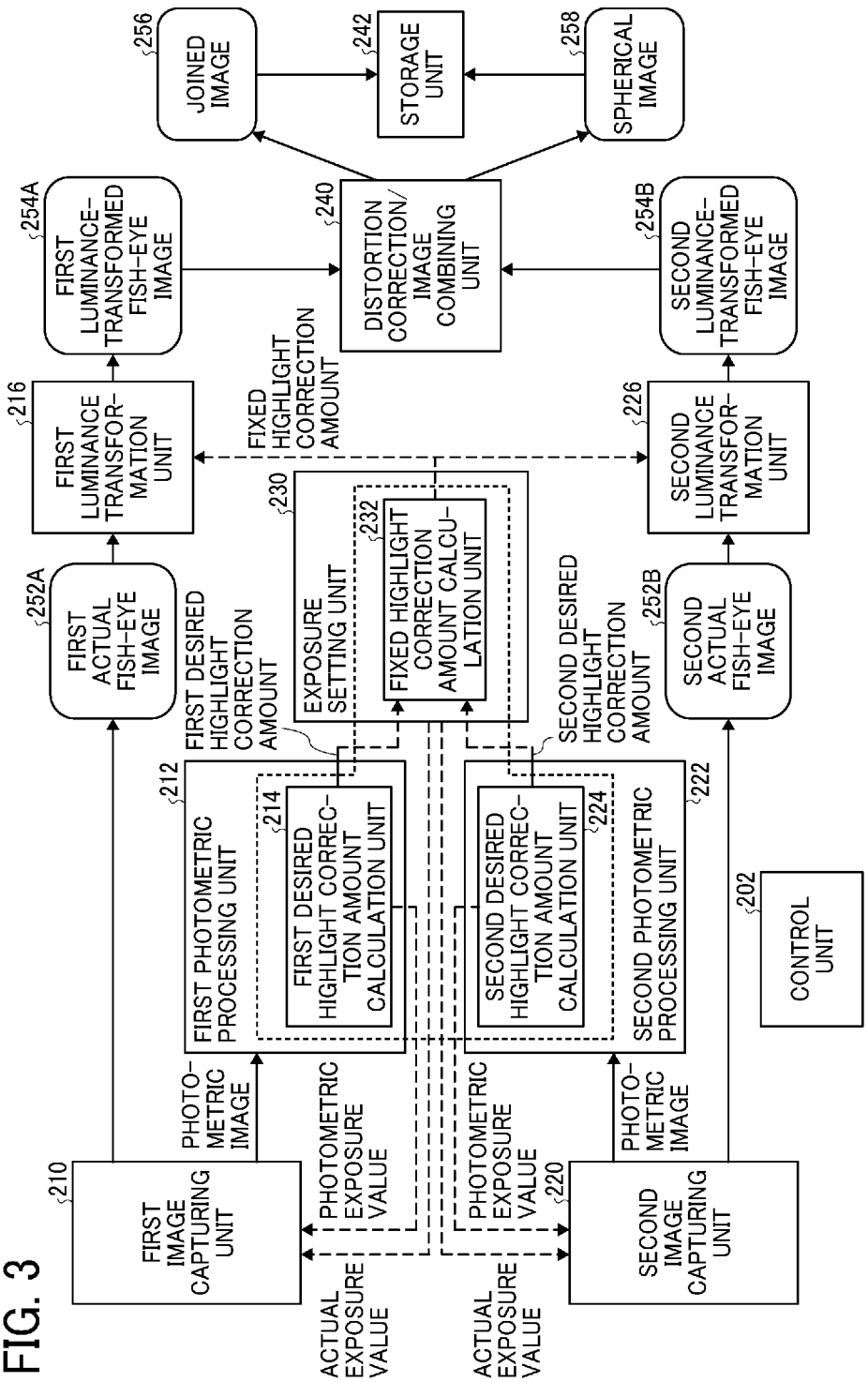
FIG. 3 is a block diagram of functions implemented by the spherical-image capturing apparatus according to an embodiment.

FIG. 3 is a block diagram of functions implemented by the spherical-image capturing apparatus 110 according to an embodiment. As illustrated in FIG. 3, the functional block of the spherical-image capturing apparatus 110 includes a control unit 202, a plurality of image capturing units 210, 220, a plurality of photometric processing units 212, 222, an exposure setting unit 230, a plurality of luminance transformation units 216, 226, and a distortion correction/image combining unit 240. The spherical-image capturing apparatus 110 according to the embodiment illustrated in FIG. 3 includes two optical systems (imaging devices). One of the optical systems includes a first image capturing unit 210, a first photometric processing unit 212, and a first luminance transformation unit 216, and the other optical system includes a second image capturing unit 220, a second photometric processing unit 222, and a second luminance transformation unit 226 as described with reference to FIG. 1. In cases where three or more optical systems (imaging devices) are included in the spherical-image capturing apparatus 110, the number of image capturing units, photometric processing unit, and luminance transformation units may be set according to the number of optical systems.

The control unit 202 includes, for example, the CPU 112 in FIG. 2. The control unit 202 controls the image capturing units 210 and 220 and thus controls the entire operation of the spherical-image apparatus 110. The control unit 202 controls each of the first image capturing unit 210 and the second image capturing unit 220 to acquire an image for photometric measurement (a photometric image) at regular intervals during standby before capturing of an image, and controls the first image capturing unit 210 and the second image capturing unit 220 to acquire a plurality of images to be combined in actual image-capturing operation.

Each of the first image capturing unit 210 and the second image capturing unit 220 is implemented by the image-forming optical system 20 and the image sensor 22 (130) in FIGS. 1 and 2. The image sensor 22 (130) of the image capturing units 210 and 220 is controlled by a control command from the control unit 202 of the CPU 112. The image sensors 22A and 22B (130A and 130B) of the image capturing units 210 and 220 start exposure and obtain data at the substantially same timing under the control of the control unit 202 (the CPU 112).

The first photometric processing unit 212 inputs, into algorithm, the luminance of the photometric image acquired by the first image capturing unit 210 at regular intervals before the actual image-capturing operation and the exposure value that has been used for acquiring the photometric image, so as to measure the luminance of a subject. Further, the first photometric processing unit 212 calculates an exposure value (the stop value, the shutter speed, and the degree sensitivity) for the next photometric-image acquisition, according to the exposure program, and sets the calculated exposure value for the first image unit 210. More specifically, the first photometric processing unit 212 according to an embodiment includes a first desired highlight correction amount calculation unit 214. Based on the acquired photometric image, the first desired highlight correction amount calculation unit 214 calculates an optimal highlight correction amount (hereinafter, referred to as a first desired highlight correction amount) according to an image capturing scene by the first image capturing unit 210.

Same as in the first photometric processing unit 212, the second photometric processing unit 222 inputs, into algorithm, the luminance of the photometric image acquired by the second image capturing unit 220 at regular intervals before the actual image-capturing operation and the exposure value that has been used for acquiring the photometric image, so as to measure the luminance of a subject. Further, the second photometric processing unit 222 calculates an exposure value (the stop value, the shutter speed, and the degree sensitivity) for the next photometric-image acquisition, according to the exposure program, and sets the calculated exposure value for the second image capturing unit 220. More specifically, same as in the first photometric processing unit 212, the second photometric processing unit 222 according to an embodiment includes a second desired highlight correction amount calculation unit 224. Based on the acquired photometric image, the second desired highlight correction amount calculation unit 224 calculates an optimal highlight correction amount (hereinafter, referred to as a second desired highlight correction amount) according to an image capturing scene by the second image capturing unit 220.

In many cases, the image-forming optical systems 20 of each of the image capturing units 210 and 220 is disposed facing a different direction, and captures an image of a different area in the surrounding landscape. For this reason, the calculated first desired highlight correction amount and the second desired highlight correction amount tend to be different values although the calculated first desired highlight correction amount and the second desired highlight correction amount may be the same value. Each of the first desired highlight correction amount and second desired highlight correction amount is represented by an appropriate value ((a correction amount of 1 Ev, etc.) and a value indicating the degree of correction (weak, medium, strong, etc.)). Each of the first desired highlight correction amount and second desired highlight correction amount constitutes an individual correction value in an embodiment. The calculated desired highlight correction amount is transferred to the exposure setting unit 230 to be described later. The first desired highlight correction amount calculation unit 214 calculates a desired highlight correction amount to be used for the image capturing unit 210 based on an image-capturing signal output from the image capturing unit 210 corresponding to the first desired highlight correction amount calculation unit 214 before the actual image-capturing operation. The second desired highlight correction amount calculation unit 224 calculates a desired highlight correction amount to be used for the image capturing unit 220 based on an image capturing signal output from the image capturing unit 220 corresponding to the second desired highlight correction amount calculation unit 224 before the actual image-capturing operation. The first desired highlight correction amount calculation unit 214 and the second desired highlight correction amount calculation unit 224 constitute an individual-value calculation unit.

The control unit 202 controls the exposure setting unit 230 to perform an appropriate exposure setting (set the exposure conditions) in response to pressing of the shutter button 18 or acceptance of an image-capturing instruction from a wired or wireless remote controller or terminal. Subsequently, the control unit 202 controls the image capturing unit 210 and the second image capturing unit 220 to acquire a plurality of images to be combined, under the set exposure conditions. The control unit 202 constitutes a control unit in the present embodiment.

The exposure setting unit 230 sets appropriate exposure conditions for each of the plurality of image capturing units 210 and 220 under the control of the control unit 202. More specifically, the exposure setting unit 230 according to an embodiment includes a fixed highlight correction amount calculation unit 232. The fixed highlight correction amount calculation unit 232 calculates a highlight correction amount (hereinafter, referred to a fixed highlight correction amount) common between the first image capturing unit 210 and second image capturing unit 220, based on the first desired highlight correction amount and second desired highlight correction amount calculated for the first image capturing unit 210 and the second image capturing unit 220.

The method of calculating the fixed highlight correction amount is not particularly limited. In some preferred embodiments, the fixed highlight correction amount calculation unit 232 compares the calculated first desired highlight correction amount and second desired highlight correction amount, and selects (determines) a larger value as the fixed highlight correction amount calculation unit from between the first desired highlight correction amount and the second desired highlight correction amount. The fixed highlight correction amount is actually applied to the first image capturing unit 210 and the second image capturing unit 220. The exposure setting unit 230 sets underexposure based on the fixed highlight correction amount, and calculates an exposure value according to an exposure program for the actual image-capturing operation. The calculated fixed highlight correction amount is transmitted to first and second luminance transformation units 216 and 226 at the subsequent stage. In some cases, the first image capturing unit 210 and the second image capturing unit 220 have different image-capturing conditions. For this reason, although no limitation is intended therein, the exposure programs is independently set for each of the first and second image capturing units 210 and 220.

The exposure setting unit 230 constitutes a setting unit in an embodiment. The fixed highlight correction amount is represented by an appropriate value (a value indicating the correction amount (for example, 1 Ev) and a value indicating the degree of correction (for example, weak, medium, strong)). The fixed highlight correction amount constitutes a common correction value in an embodiment. The fixed highlight correction amount calculation unit 232 constitutes a common-value calculation unit in an embodiment. Further, a combination of the first desired highlight correction amount calculation unit 214, the second desired highlight correction amount calculation unit 224, and the fixed highlight correction amount calculation unit 232 calculates a common correction value based on the image-capturing signals output from the image capturing units 210 and 220. This combination constitutes a calculation unit 260 in an embodiment.

When the exposure value is set by the exposure setting unit 230, under the set exposure conditions, the control unit 202 controls the first image capturing unit 210 and the second image capturing unit 220 to capture actual fish-eye images 252A and 252B, respectively to be combined while performing other image signal processes.

The first luminance transformation unit 216 receives a first actual fish-eye image 252A captured by the first image capturing unit 210, and performs luminance transformation on the received first actual fish-eye image 252A (transforms the luminance of the received first actual fish-eye image 252A) according to the fixed highlight correction amount. Similarly, the second luminance transformation unit 226 receives a second actual fish-eye image 252B captured by the second image capturing unit 220, and performs luminance transformation on the received second actual fish-eye image 252B (transforms the luminance of the received second actual fish-eye image 252B) according to the fixed highlight correction amount. Each of the first luminance transformation unit 216 and the second luminance transformation unit 226 constitutes a luminance transformation unit.

The process of correcting highlight (highlight correction) is described in detail with reference to FIG. 4. FIG. 4 is a graph for describing the relation between an input signal and an output signal after the luminance transformation in each of the case where the highlight correction is performed and the case where the highlight correction is not performed. First, the highlight correction is a type of the dynamic range correction technology that changes the image-capturing exposure and the process of transforming the luminance of a captured image so as to reduce the deterioration in gradation such as halation (overexposure) in the captured image. More specifically, the highlight correction is a process that sets underexposure such that the exposure level for capturing an image is lowered from a proper exposure level, and corrects the luminance of a captured image so as to increase the halftone level of the captured image. Thus, the overall brightness of resultant image can be maintained at a level equal to the proper exposure level, and the deterioration in gradation (overexposure/halation) in a high-luminance area of the resultant image can be reduced by the amount of underexposure at which the image has been captured.

First, the capturing of an ordinary still image without the highlight correction is described. In the present embodiment, it is assumed that RAW data having a pixel value represented by a predetermined number of bits (12 bits in the example illustrated in FIG. 4) is obtained by the capturing of a still image. In addition, when a subject of an 18% gray is captured, the pixel values of the captured image is controlled to become a predetermined value (for example, gradation value of 512) according to an automatic exposure (AE) algorithm. The predetermined value (the above-described gradation value of 512), which is a target value, is referred to as an AE target.

In this case, when RAW data represented by a first bit (for example, 12 bits) is transformed into data represented by a second bit (for example, 8 bits) that is used in the typical image format, a pixel value represented by the first bit (for example, 12 bits) is transformed into a value represented by the second bit (for example, 8 bits), using a prescribed luminance transformation curve. In the example illustrated in FIG. 4, the pixel value of the gradation value of 512 that is the AE target is transformed into a pixel value represented by the gradation value of 118 that is the target luminance value, using the prescribed luminance transformation curve.

The luminance transformation curve used when the AE is the gradation value of 512 is referred to as the luminance transformation curve at the regular highlight correction amount of 0 Ev in FIG. 4. In the following example case, the luminance transformation is performed at the same time when the 12-bit data is transformed into the 8-bit data. However, the luminance transformation may not be performed at the same time of the transformation of bits as long as the same effects can be obtained.

The following describes a case where the highlight correction is performed. Note that the unit of the highlight correction amount is exposure value (Ev) same as the unit of the typical exposure correction amount. Assuming that the highlight correction amount is 1 Ev, the exposure level is lowered (underexposure is set) by the amount of highlight correction. Accordingly, the AE target is set to a value (for example, the gradation value of 256 reduced by, for example, 1 Ev) reduced by a certain highlight correction amount from the original value (for example, the gradation value of 512). At the time of the transforming of the luminance, the pixel value with a 12-bit gradation of 256 is transformed into a pixel value with an 8-bit gradation of 118, using the luminance transformation curve. The luminance transformation curve used when the AE target is the gradation value of 256 is referred to as the luminance transformation curve at the highlight correction (amount) 1 Ev.

The 12-bit pixel value of an image captured with the highlight correction of 1 Ev performed is half of the 12-bit pixel value of an image captured without the highlight correction. By applying the luminance transformation curve at the highlight correction 1 Ev, the pixel value reduced to half of the image captured without the highlight correction is transformed into the same value as the 8-bit pixel value of an image captured at the regular mode (captured without the highlight correction). The overall brightness of the captured image remains unchanged irrespective of the presence or absence of the highlight correction. Further, among the pixels that reach the saturation level of 4095 (the maximum value of 12-bit gradation) at the regular image-capturing operation (without the highlight correction), some pixels come to have values in the range of from 2048 to 4095 at the highlight correction 1 Ev. In such a case, the pixels that have reached the maximum value of 255 at the 8-bit gradation in the regular image-capturing operation are reduced to a value less than the maximum value of 255 when the highlight correction is performed. As a result, any halation (overexposure) does not occur in such a pixel due to the highlight correction.

With the above-described configuration, the highlight correction can reduce or eliminate the deterioration in the gradation of a high-luminance area of a captured image while maintaining the overall brightness in the captured image.

The following description is made with reference to FIG. 3. The luminance transformation units 216 and 226 described above generates the first fish-eye image 254A and the second fisheye image 254B, the luminance of each of which has been transformed, from the actual fish-eye image 252A and the actual fish-eye image 252B. These generated first fish-eye image 254A and the second fisheye image 254B are transmitted to the distortion correction/image combining unit 240. Note that the first and second fish-eye images 252A and 252B are appropriately subjected to the regular image signal processing such as white balance setting and gamma setting before or after the luminance transformation. Furthermore, the first and second fish-eye images 252A and 252B may be converted into luminance data and color difference through filtering processing. These various types of fish-eye image data are written in an appropriate storage area such as the DRAM 132.

The distortion correction/image combining unit 240 combines the fish-eye images 254A and 254B obtained from the plurality of image capturing units 210 and 220. More specifically, the distortion correction/image combining unit 240 performs a distortion correction process and an image combining process on the fish-eye images 254A and 254B.

Figure 5B:
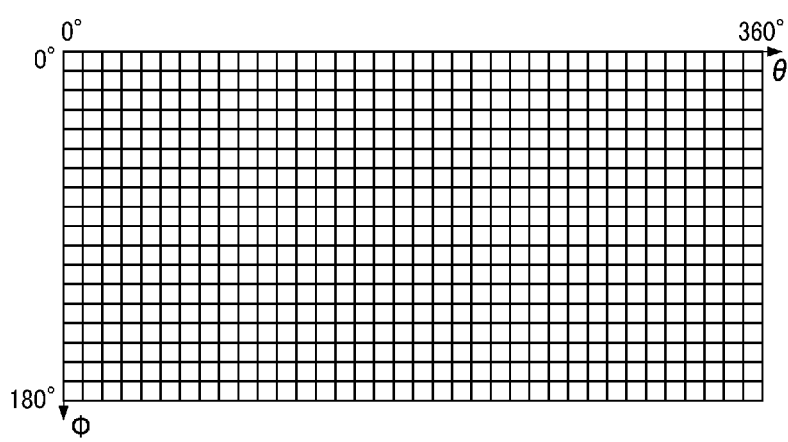
FIG. 5B is an illustration of a planar data structure of a spherical image.

Hereinafter, a process of generating a spherical image and a generated spherical image are described with reference to FIGS. 5A, 5B, and 5C. FIG. 5A is an illustration of the data structure of each image and the data flow of the image in the process of generating a spherical image. First, an image directly captured by each of the image sensors 130A and 130B is an image that roughly convers a hemisphere of the whole sphere as a field of view. Light that passes through the image-forming optical system 20 is focused on the light receiving area of the image sensor 130 to form an image according to a predetermined projection system. The image sensor 130 is a two-dimensional image sensor whose light-receiving area defines a planar area. Accordingly, the image formed by the image sensor 130 is image data represented by the plane coordinate system. A formed image is configured as a typical fish-eye image that contains an image circle as a whole in which each captured area is projected, as illustrated in a fish-eye image A and a fish-eye image B in FIG. 5A. The following embodiment is described with a fish-eye image captured using a fish-eye lens. However, such a fish-eye image includes a wide-angle image captured using a wide-angle lens other than the fish-eye lens.

The plurality of fish-eye images captured by the plurality of image sensors 130 are subjected to the distortion correction process and the image combining process so as to generate one spherical image. In the image combining process, two spherical images each including a complementary hemispherical portion are generated from the fish-eye images each configured as a planar image. Then, the two spherical images including the respective hemispherical portions are joined together by matching the overlapping areas of the hemispherical portions, and the spherical images are synthesized to generate a full spherical (omnidirectional) image including the whole sphere.

FIG. 5B is an illustration of a planar data structure of the image data of a spherical image used in the embodiment of the present disclosure. FIG. 5C is an illustration of a spherical data structure of the image data of the spherical image. As illustrated in FIG. 5B, the image data of the spherical image is expressed as an array of pixel values in the coordinates defined by the vertical angle $\varphi$ corresponding to the angle with reference to a referential axis and the horizontal angle $\theta$ corresponding to the angle of rotation around the referential axis. The vertical angle $\varphi$ ranges from 0° to 180° (alternatively from −90° to +90°), and the horizontal angle $\theta$ ranges from 0° to 360° (alternatively from −180° to +180°).

Figure 5C:
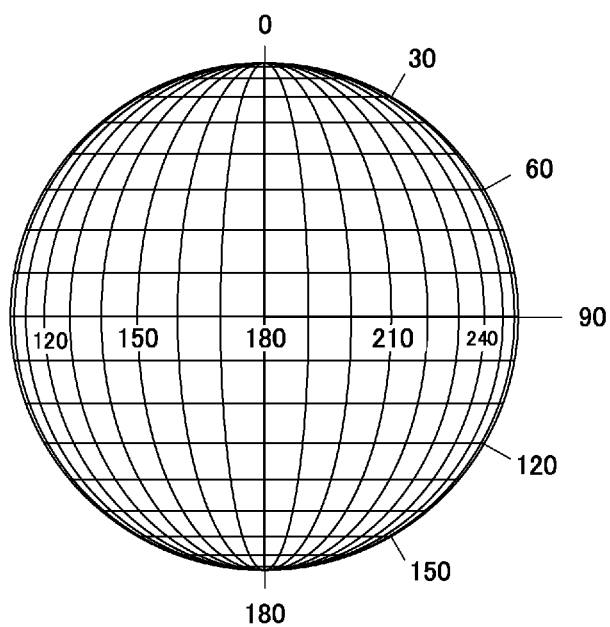
FIG. 5C is an illustration of a spherical data structure of the spherical image.

As illustrated in FIG. 5C, the respective coordinate values ($\theta$, $\varphi$) of the spherical image format (the spherical data structure of the image data) are associated with the points on the sphere that represents all directions from the photographing location. Thus, all directions are associated with the points on the spherical images. The plane coordinates of the fish-eye image captured by a fish-eye lens are associated with the coordinates on the sphere of the spherical image, which are included in a predetermined transformation table. The transformation table includes data prepared in advance by, for example, a manufacturer in accordance with a predetermined projection model based on design data of each lens optical system. The data of the transformation table is used for transforming a fish-eye image into a spherical image in consideration of distortion. In performing the distortion correction process and the image combining process, data may be temporarily stored in the DRAM 132.

Note that, in the distortion correction process and the image combining process, the distortion correction/image combining unit 240 performs the distortion correction and the zenith correction using the information acquired from the sensor 136 so as to generate a combined image on which the zenith correction has been performed. In general, the zenith correction and the distortion correction are irreversible transformation processes, respectively, and are described herein as being performed at the same time. However, the zenith correction and the distortion correction may be performed in separate timings.

The zenith correction is a correction process that corrects an image captured with the central axis (see FIG. 1) of the spherical-image capturing apparatus 110 tilted with respect to the reference direction (for example, the direction of gravity) so as to obtain an image whose central axis is aligned with the direction Z of gravity. In a specific embodiment, in addition to the zenith correction, a rotation correction that cancels the angle change around the reference direction may be performed.

With the distortion correction process and the image combining process by the distortion correction/image combining unit 240, the distortion correction/image combining unit 240 generates a spherical image (the equirectangular format) 258. The distortion correction/image combining unit 240 constitutes a combining processing unit that generates a combined image based on a plurality of fish-eye images captured by the plurality of image capturing units 210 and 220 and the luminance of each of which has been transformed.

In the present embodiments, it is assumed that the distortion correction/image combining unit 240 generates as a combined image a spherical image 258 obtained by the coordinate transformation. However, there is no need to generate such a combined image as the combined spherical image as illustrated in FIG. 5A. The combined image may be generated in any desired form as long as a spherical image can be constituted at the time of viewing.

For example, assuming that a spherical image is generated by performing the distortion correction and combining processes on the fish-eye images at the time of viewing, two pieces of still-image data (the still images that correspond to the fish-eye image A and the fish-eye image B in FIG. 5A) of the fish-eye images directly captured by the image sensors 130A and 130B are joined together side by side, so as to generate one image. A still image of the generated one image (a joined image 256 (in the dual fish-eye format)) may be generated. Further, the combined image may not be generated in one file, but may be in separate files associated with two fish-eye images directly captured by the image sensors 130A and 130B.

The functional block of the spherical-image capturing apparatus 110 may further include a storage unit 242 as illustrated in FIG. 3. The storage unit 242 outputs the generated spherical image 258 or the joined image 256, and stores the image in a predetermined storage device or medium. The storage unit 242 constitutes an output unit in the present embodiment.

Also, the format of the output image (spherical image or joined image) is not particularly limited. The spherical-image capturing apparatus 110 further includes a codec processing unit. The codec processing unit 250 includes the still-image compression block 117 in FIG. 2. The spherical image 258 in the form of the YUV format or the joined image 256 in the form of the YUV format output from the distortion correction/image combining unit 240 is converted into a predetermined still-image format, and is stored as a spherical still image or a joined still image in the predetermined still image format (for example, JPEG) by the codec processing unit 250. The generated image may be stored in the external memory 134 or may be stored within a memory of an external information terminal via the USB connector 138 or the wireless network interface card (NIC) 140.

Note that a still image may be recorded in any format as long as the still image is re-produceable. Examples of still-image format include JPEG, portable network graphics (PNG), and bitmap (BMP).

The above-described spherical-image capturing apparatus 110 combines the image-capturing range of the image capturing unit 210 and the image-capturing range of the image capturing unit 220, so as to capture an omnidirectional image around the shooting location at one time.

Further, in the embodiment to be described, the description has been made assuming that a combined image obtained by combining a plurality of images whose luminance has been transformed on the spherical-image capturing apparatus 110 side is output (the process of transforming the luminance is performed by the spherical-image capturing apparatus 110). However, in some other embodiments, the process of transforming the luminance may be performed by the external information processing terminal communicably connected to the spherical-image capturing apparatus 110 via the USB connector 138 or the wireless NIC 140.

In this case, for example, the spherical-image capturing apparatus 110 combines/joins the actual fish-eye images 252A and 252B captured by the image capturing units 210 and 220 at the actual image-capturing operation so as to generate a combined image, and adds information (the fixed highlight correction amount) for transforming the luminance of the fish-eye images of the combined image to data of the combined image (for example, RAW data), thus outputting the data to the external processing device. In this case, at the time of viewing, a reproduction device reads out the fixed highlight correction amount and perform the process by the luminance transformation unit 215, and further perform the process by the distortion correction/image combining unit 240.

Note that each of the above-described photometric processing units 212 and 222, exposure setting unit 230, luminance transformation units 216 and 226, and distortion correction/image combining unit 240 is appropriately implemented by either one or both of the CPU 112 and the image processing block 116.

Figure 6:
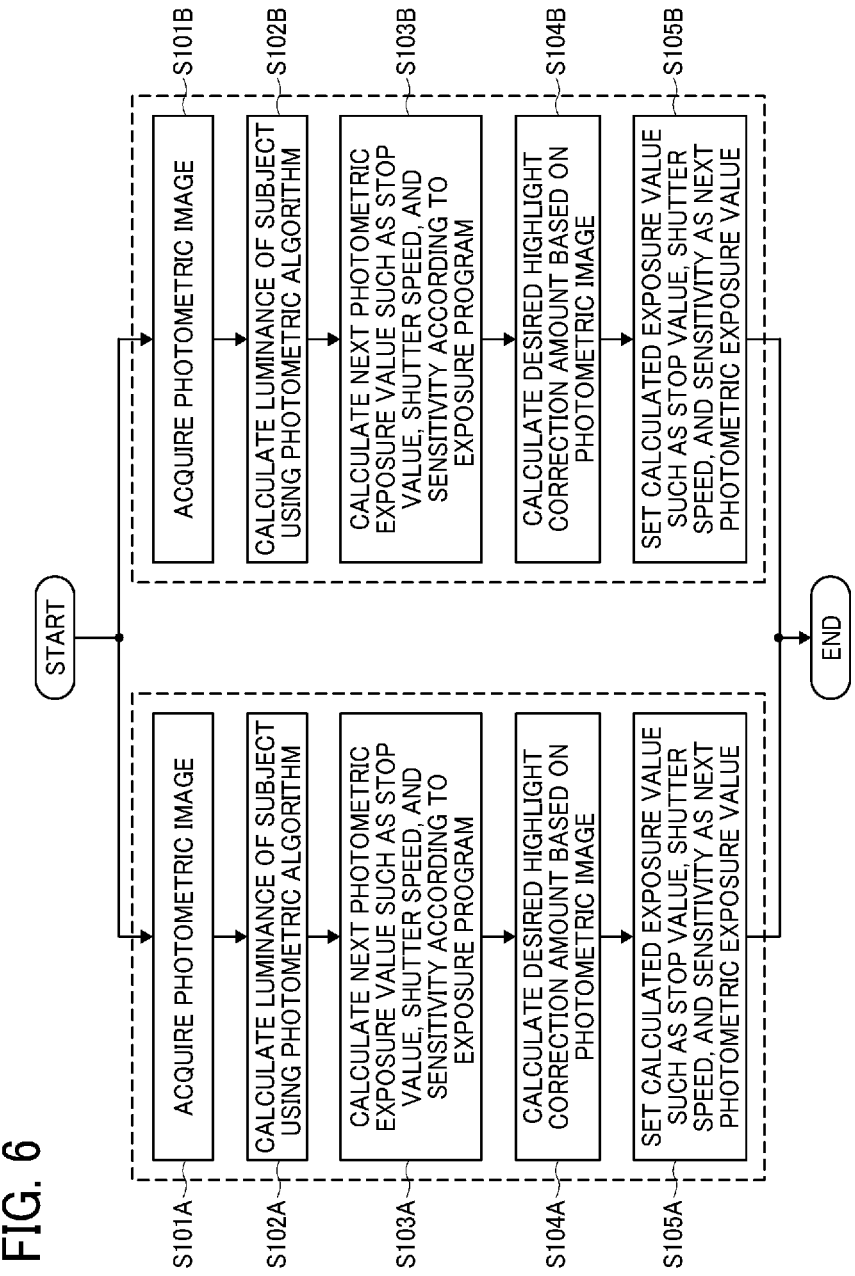
FIG. 6 is a flowchart showing a photometric process that constitutes a part of the omnidirectional imaging process executed by the omnidirectional imaging apparatus according to the present embodiment.

Hereinafter, the process of capturing a spherical image according to an embodiment is described in detail with reference to FIGS. 6 and 7. FIG. 6 is a flowchart of a photometric process that is a part of the process of capturing a spherical image performed by the spherical-image capturing apparatus 110 in at least one embodiment.

The spherical-image capturing apparatus 110 performs a still-image capturing process (captures a still image) in response to pressing of the shutter button 18 or acceptance of an image-capturing instruction from a wired or wireless remote controller or terminal. In the still-image capturing process, a photometric process is performed at the image-capturing standby state.

The process illustrated in FIG. 6 is a cycle of the still-image capturing process performed at regular time intervals, and starts at one process corresponds to one process performed at each time interval. The transition to the image-capturing standby state during the still-image capturing process is not particularly limited, but may be performed in response to a detection of the half-pressed state of the shutter button 18 of the spherical-image capturing apparatus 110 if possible, or in response to acceptance of an image-capturing standby instruction from a wired or wireless remote controller or terminal. When the still-image capturing process starts, the system of the first image capturing unit 210 performs steps S101A to S105A whereas the system of the second image capturing unit 220 performs steps S101B to S105B.

In step S101A/B, each of the image capturing units 210 and 220 acquires a photometric image. In step S102A/B, each of the photometric processing units 212 and 222 calculates a luminance of a subject in the acquired photometric image according to a photometric algorithm of the corresponding to photometric processing unit 212/222. In step S103A/B, each of the photometric processing units 212 and 222 calculates an exposure value (stop value, shutter speed, and sensitivity) for acquiring a next photometric image according to an exposure program of the corresponding photometric processing units 212/222.

In step S104A/B, the photometric processing units 212 and 222 calculates a highlight correction amount for the scene based on the luminance distribution of the photometric image and the result of the scene analysis, using the desired highlight correction amount calculation units 214 and 224, respectively. In step S105A/B, the exposure setting unit 230 sets the exposure value calculated according to the exposure program for each of the image capturing units 210 and 220, used to acquire a next photometric image. Then, one cycle of the photometric process ends. The process illustrated in FIG. 6 is repeated at predetermined time intervals until the shutter button 18 is pressed or the image-capturing standby state is canceled during the image-capturing standby state.

Figure 7:
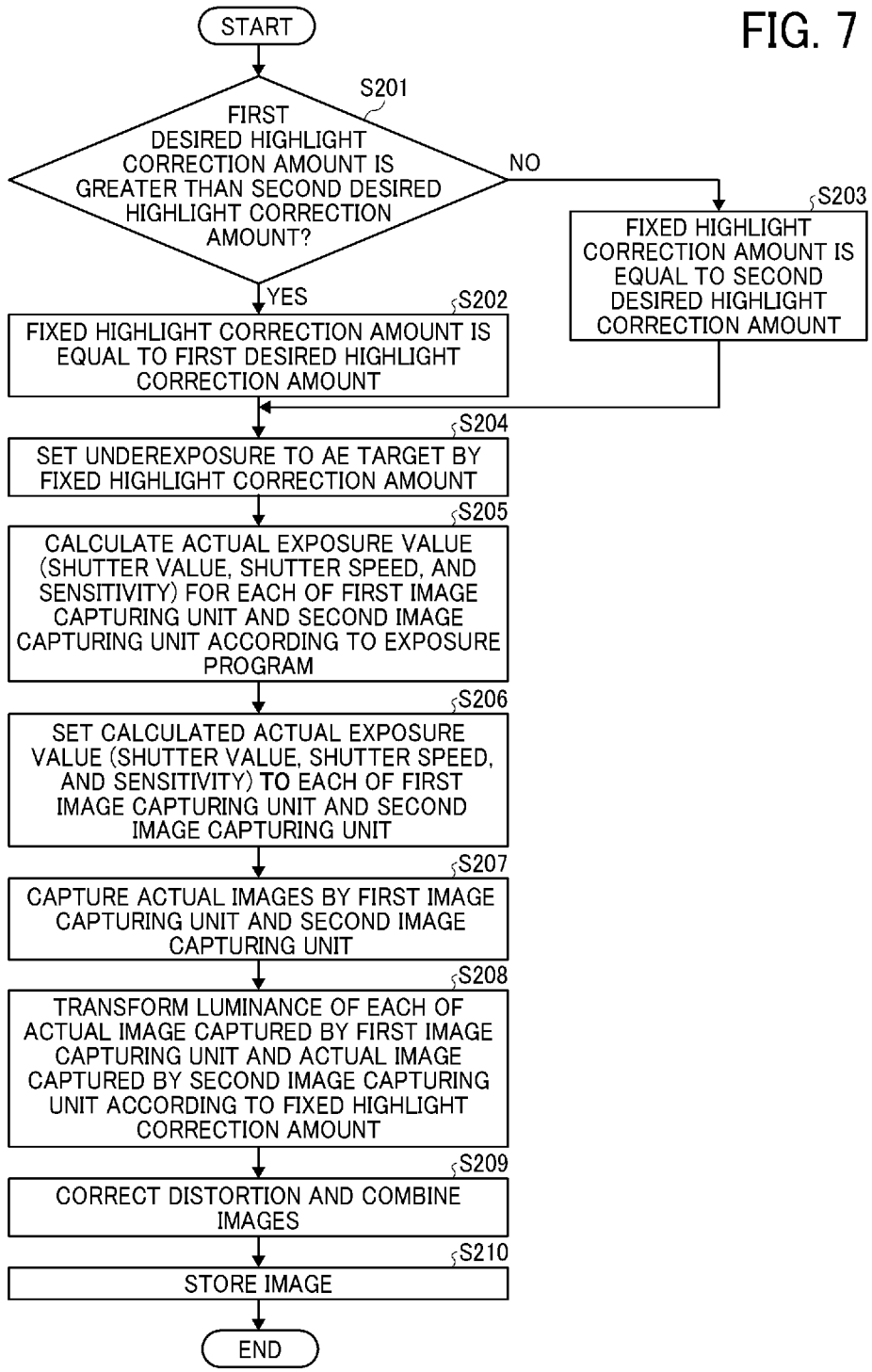
FIG. 7 is a flowchart showing a real imaging process that constitutes a part of the omnidirectional imaging process executed by the omnidirectional imaging apparatus according to the embodiment.

FIG. 7 is a flowchart of an actual image-capturing process that is a part of the process of capturing a spherical image performed by the spherical-image capturing apparatus 1101 in at least one embodiment.

The process illustrated in FIG. 7 starts in response to, for example, pressing of the shutter button 18. Before the actual image-capturing process starts, the photometric process in FIG. 6 has been performed at least one time, and the first and second desired highlight correction amounts have been obtained yet.

In step S201, the fixed highlight correction amount calculation unit 232 compares the latest first desired highlight correction amount and the latest second desired highlight correction amount obtained by the previous photometric process in FIG. 6, so as to determine whether the first desired highlight correction amount is larger than the second desired highlight correction amount. When it is determined that the first desired highlight correction amount is larger than the second desired highlight correction amount (YES in step S201), the fixed highlight correction amount calculation unit 232 selects the first desired highlight correction amount as the fixed highlight correction amount in step S202. Then, the process proceeds to step S204. When it is determined that the first desired highlight correction amount is less than or equal to (not larger than) the second desired highlight correction amount (NO in step S201), the fixed highlight correction amount calculation unit 232 selects the second desired highlight correction amount as the fixed highlight correction amount in step S203. Then, the process proceeds to step S204.

In step S204, as described with reference to FIG. 4, the exposure setting unit 230 reduces the AE target according to the fixed highlight correction amount so as to set underexposure. For example, if the fixed highlight correction amount is lowered by 1 Ev, the AE target is reduced by 1 Ev from the original value (for example, the gradation value of 512) so as to be the gradation value of 256.

In step S205, the exposure setting unit 230 calculates an exposure value (values of stop, shutter speed, and sensitivity) for use in the actual image-capturing operation (actual exposure value) for each of the image capturing units 210 and 220 according to the exposure program for the actual image-capturing operation so as to obtain the AE target. In this case, a different exposure program may be applied to the operation of each of the image capturing units 210 and 220 because various image capturing conditions might differ between the image capturing units 210 and 220.

In step S206, the exposure setting unit 230 sets the calculated exposure values (actual exposure value) for the actual image-capturing operation, to each of the first image capturing unit 210 and the second image capturing unit 220. In step S207, the control unit 202 controls the first image capturing unit 210 and the second image capturing unit 220 to capture actual fish-eye images 252A and 252B under the set exposure conditions, respectively.

In step S208, the first luminance transformation unit 216 transforms the luminance of the captured actual fish-eye image 252A, using the luminance transformation curve based on the fixed highlight correction amount, and the second luminance transformation unit 226 transforms the luminance of the captured fish-eye image 252B, using the luminance transformation curve based on the fixed highlight correction amount.

In step S209, the distortion correction/image combining unit 240 deforms and joins the images captured by the first image capturing unit 210 and the second image capturing unit 220 through the stitching process so as to generate a spherical image. In step S210, the storage unit 242 stores the generated spherical image in a storage memory, for example.

In the above-described process, one of the different two desired highlight correction amounts is selected to be commonly used. This is because applying the same luminance transformation curve to the image capturing units 210 and 220 prevents the occurrence of the difference in luminance in a joint portion of the spherical image generated by the stitching process. However, if different highlight correction amounts are applied to the images captured by two image capturing units, the amount of halation (overexposure) differs depending on a highlighted portion of a subject due to the highlight correction mechanism. Especially when an overexposure area and a less-overexposure area (at which the degree of overexposure is relatively lower) exit in the joint portion, the difference in luminance clearly occurs in the joint portion of the spherical image, which makes the boundary of the joined images (combined image) conspicuous. Thus, the combined image looks unnatural for the user. In order to avoid such a situation, the same highlight correction amount is applied to each of the image capturing units 210 and 220. When the automatic highlight correction is individually performed on each of the plurality of image capturing units, the amount of highlight correction varies depending on the image capturing unit. In view of this circumstances, the highlight correction according to the embodiments is more advantageous than such an individual automatic highlight correction.

In addition, the reason why the larger one of the desired highlight correction amounts calculated for the first image capturing unit 210 and the second image capturing unit 220 is in that selecting the larger highlight correction amount from the highlight correction amounts of the image capturing units 210 and 220 enables correcting of more amount of overexposure (halation) caused by either one of the image capturing units 210 and 220. In such a configuration, when the two desired highlight correction amounts are different from each other, a larger amount of highlight correction than the desired highlight correction amount required is applied to either one of the image capturing units. Even such an application can prevent information loss due to overexposure.

Accordingly, the quality of a resultant spherical image can be increased. In the case where three or more optical systems (imaging devices) are incorporated in the image capturing apparatus 110, a maximum value may be selected from three or more calculated desired highlight correction amounts.

The present disclosure is made in light of the above-described situation, and an object of the disclosure is to provide an image capturing apparatus including a plurality of imaging devices, capable of generating an image whose deterioration in gradation is reduced and whose differences in brightness in a subject at the joint portions of joined images is reduced. Further, an image-capturing method and a recording medium are also provided.

In the above-described embodiments, the highlight correction for improving the deterioration in gradation (overexposure) on the high luminance side is described. Further, the shadow correction for improving the deterioration in gradation (underexposure) on the low luminance side is also available.

In the above-described embodiments, as an example of the dynamic range correction technique, the highlight correction is described that captures an image at the exposure level lowered than the proper exposure level and corrects the luminance of the captured image so as to increase the halftone level, so that the deterioration (overexposure) in gradation on the high luminance side is improved. Since the digital camera has the capability of adapting to the underexposure, the configuration that sets the exposure conditions based on the same correction value applied to the plurality of image capturing units is preferably applied to the highlight correction. However, the highlight correction is an example of the dynamic range correction technique, and is not limited to the embodiment in which the above-described configuration is applied to the highlight correction. In other embodiments, the above-described configuration is applicable to shadow correction. In this case, contrary to the highlight correction, in order to improve the deterioration in gradation on the low-luminance side (underexposure), an image is captured at the exposure level increased from the proper exposure level, and the luminance of the captured image is corrected so as to reduce the halftone level. With this shadow correction, the overall brightness of a resultant image can be maintained at a level equal to the level of the proper exposure, and the deterioration in gradation (underexposure) in a low-luminance area of the resultant image can be reduced by the amount of overexposure at which the image has been captured.

In the embodiments described above, the cases where a still image is captured are described. However, no limitation is intended herein. In some embodiments, the embodiments of the present disclosure may be applied to the capturing of a moving image and a time-lapse moving image, and an interval shooting.

The functional units as described above is realized by a computer-executable program written by legacy programming language or object-oriented programming language such as assembler language, C language, C++ language, C# language, and Java (registered trademark), and the program can be distributed via telecommunication line or upon being written on a computer-computer-readable recording medium such as ROM, electrically erasable and programmable read only memory (EEPROM), erasable programmable read only memory (EPROM), flash memory, flexible disk, compact disc read only memory (CD-ROM), compact disc rewritable (CD-RW), digital versatile disk (DVD)-ROM, DVD-RAM, DVD-RW, Blu-ray disc, secure digital (SD) card, and magneto-optical disc (MO). All or some of the functional units described above can be implemented, for example, on a programmable device such as a field programmable gate array (FPGA), or as an application specific integrated circuit (ASIC). To implement such functional units on the programmable device, circuit configuration data (bit stream data) to be downloaded to the programmable device can be distributed using a recording medium that stores data written in, for example, a hardware description language (HDL), Very High Speed Integrated Circuit Hardware Description Language (VHDL), or Verilog HDL.

Numerous additional modifications and variations are possible in light of the above teachings. It is therefore to be understood that, within the scope of the appended claims, the disclosure of this patent specification may be practiced otherwise than as specifically described herein.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

The present invention can be implemented in any convenient form, for example using dedicated hardware, or a mixture of dedicated hardware and software. The present invention may be implemented as computer software implemented by one or more networked processing apparatuses. The processing apparatuses can include any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any conventional carrier medium (carrier means). The carrier medium can compromise a transient carrier medium such as an electrical, optical, microwave, acoustic or radio frequency signal carrying the computer code. An example of such a transient medium is a TCP/IP signal carrying computer code over an IP network, such as the Internet. The carrier medium can also comprise a storage medium for storing processor readable code such as a floppy disk, hard disk, CD ROM, magnetic tape device or solid state memory device.

This patent application is based on and claims priority pursuant to Japanese Patent Application No. 2019-014627, filed on Jan. 30, 2019 in the Japan Patent Office, the entire disclosure of which is hereby incorporated by reference herein.

REFERENCE SIGNS LIST

12 Imaging body,
14 Casing,
18 Shutter button,
20 Image-forming optical system,
22, 130 Image sensor,
110 Spherical image capturing apparatus,
112 CPU,
114 ROM,
116 Image processing block,
117 Still-image compression block,
118 Moving-image compression block,
119 Resize block,
120, 126 Interface,
122 Storage interface,
124 External sensor interface,
126 USB interface,
128 Serial block,
132 DRAM,
134 External memory,
136 Sensor,
138 USB connector,
144 Face detection block,
146 Audio unit,
148 Microphone,
150 Speaker,
152 LCD driver,
154 LCD monitor,
202 Control unit,
210 First image capturing unit,
212 First photometric processing unit,
214 First desired highlight correction amount calculation unit,
216 First luminance transformation unit,
220 Second image capturing unit,
222 Second photometric processing section,
224 Second desired highlight correction amount calculation unit,
226 Second luminance transformation unit,
240 Distortion correction/image combining unit,
242 Storage unit,
260 Calculation unit

The invention claimed is:

1. An image capturing apparatus comprising:
a plurality of image capturers;
calculation circuitry configured to calculate a common correction value commonly applied to the image capturers in performing dynamic range correction, based on an image-capturing signal output from each of the plurality of image capturers;
setting circuitry configured to set an exposure condition for each of the image capturers based on the common correction value;
control circuitry configured to control the plurality of image capturers to capture fisheye images under the set exposure condition for each of the image capturers; and
combining processing circuitry configured to combine the fisheye images to generate a spherical image.

2. The image capturing apparatus according to claim 1, wherein the calculation circuitry includes:

individual-value calculation circuitry to calculate an individual correction value of the dynamic range correction for each of the plurality of image capturers, based on the image-capturing signal output from each of the plurality of image capturers before capturing of the fisheye images under the set exposure condition; and common-value calculation circuitry to calculate the common correction value based on the individual correction value calculated for each of the plurality of image capturers.

3. The image capturing apparatus according to claim 2, wherein:

the common-value calculation circuitry selects, as the common correction value, a largest value from the individual-correction values each calculated for each of the plurality of image capturers.

4. The image capturing apparatus according to claim 1, further comprising:

luminance transformation circuitry configured to transform a luminance of each of the fisheye images captured by the plurality of image capturers under the set exposure condition, wherein the combining processing circuitry is configured to combine the fisheye images after the luminance of each of which has been transformed by the luminance transformation circuitry to generate the spherical image.

5. The image capturing apparatus according to claim 4, output circuitry configured to output the spherical image generated by the combining processing circuitry.

6. The image capturing apparatus according to claim 3, output circuitry configured to output the spherical image with addition of information for transforming luminance of each of the fisheye images of the spherical image, to an external device.

7. The image capturing apparatus according to claim 1, wherein:

the dynamic range correction is highlight correction to set the exposure condition to underexposure according to the common correction value such that an exposure level is reduced from a proper exposure level.

8. The image capturing apparatus according to claim 1, wherein:

the image capturing apparatus is a spherical-image capturing apparatus, and the spherical image is a joined image obtained by joining the fisheye images.

9. An image capturing method comprising:

calculating a common correction value commonly applied to a plurality of image capturers in performing dynamic range correction, based on image-capturing signals output from the plurality of image capturers, setting an exposure condition for each of the plurality of image capturers, based on the common correction value;

capturing fisheye images under the set exposure condition for each of the image capturers; and combining the fisheye images to generate a spherical image.

10. The image capturing method according to claim 9, wherein:

the calculating of the common correction value includes calculating an individual correction value of the dynamic range correction for each of the plurality of image capturers, based on the image-capturing signal output from each of the plurality of image capturers before capturing of the fisheye images under the set exposure condition; and the calculating of the common correction value is performed based on the individual correction value calculated for each of the plurality of image capturers.

11. A non-transitory computer readable medium storing computer-executable instructions which, when executed by a computer system, cause the computer system to carry out a method comprising:

calculating a common correction value commonly applied to a plurality of image capturers in performing dynamic range correction, based on image-capturing signals output from the plurality of image capturers, setting an exposure condition for each of the plurality of image capturers, based on the common correction value;

capturing fisheye images under the set exposure condition for each of the image capturers; and combining the fisheye images to generate a spherical image.

* * * * *